3,464,829
BREAD SOFTENERS AND DOUGH IMPROVERS
John J. Geminder, Bayside, and Carl P. Hetzel, Bellerose, N.Y., assignors to Chas. Pfizer & Co., Inc., New York, N.Y., a corporation of Delaware
No Drawing. Filed Jan. 25, 1967, Ser. No. 611,552
Int. Cl. A21d 2/08
U.S. Cl. 99—91                8 Claims

ABSTRACT OF THE DISCLOSURE

Combinations of at least one of the sodium, potassium-calcium and magnesium salts of monostearyl acid fumarate in microcrystalline form with finely-divided stearic acid at a level of from about 15% to about 50% by weight of the fumarate salt afford an improved shelf-life for bread and other finished bakery goods when incorporated into the dough of such goods prior to baking.

---

This invention relates to new methods for improving the texture, antistaling properties and overall shelf-life of yeast-leavened doughs and of baked goods made from such doughs, especially breads, rolls and cakes, etc. It also concerns novel combinations and compositions of certain microcrystalline salts of monostearyl fumaric acid, especially the non-toxic alkali metal salts, sodium and potassium, and the alkaline-earth metal salts, calcium and magnesium, together with finely-divided stearic acid. It is these new microcrystalline compositions which are utilized as the bread softeners and dough improvers of the present invention.

In recent years, a new and large industry has arisen in the preparation and sale of prepackaged baked goods. It has been particularly difficult to obtain bakery products, wherein the principal leavening agent is yeast, which remain soft and fresh-appearing when stored for any appreciable length of time. Dough-making and baking have continued to be an art rather than an exact science. Besides variations in yeast and similar leavening agents, particularly critical are the variations in flour characteristics, not only between two types of flours but even between two batches of the same flour. Bakery products made from doughs from different flour batches thus have varied widely in grain, texture, resistance to firming or staling and general overall quality. A number of bread softeners and dough improvers have lately been developed, notably those described and claimed in Belgian Patent No. 652,643, granted Mar. 3, 1965. According to another recently developed method, the firming rate of baked leavened flour products and other bakery goods is retarded by incorporating in the doughs certain microcrystalline salts of monoalkyl acid fumarates, these salts themselves being generally known in the prior art in microcrystalline form but their use in doughs and baked goods being entirely new as are their microcrystalline forms. Such additives, of course, increase the cost of the bakery products in general and hence, the search for still better bread softeners again continues.

A primary object of the present invention, therefore, is to devise new antistaling agents which will provide the same shelf-like as those employed today, but yet lessen the cost to the baking industry and to the consumer. Another object of the invention is to provide processes for making yeast-leavened baked goods utilizing these new and improved additives.

These and other objects are now realized by the present invention which broadly encompasses incorporating in the yeast-leavened dough prior to baking from about 0.05% to about 2.0%, by weight of the flour content of the dough, of certain novel combinations of an alkali metal or alkaline-earth metal salt of monostearyl fumaric acid in microcrystalline form, or mixtures of these, together with finely-divided stearic acid. When the stearic acid component is substituted in yeast-leavened dough on an equivalent weight basis for a portion of the now prior art microcrystalline fumarate salt, the shelf-life of the resulting bakery product, e.g., bread or rolls or coffee cakes, thereafter made from the dough, is still substantially the same or even better, even though the stearic acid component is without the same effect when used alone. Alternatively, and also, of course, extremely much more important in such a cost-conscious industry, to obtain essentially the same shelf-life storage of the ultimate bakery product as is obtained, for instance, with microcrystalline forms of monostearyl fumarate salt, when used alone, one may substitute for that salt in the dough from about one-fifth to about one-half by weight of finely-divided stearic acid.

This effect of stearic acid in yeast-leavened doughs is particularly surprising because if used alone, i.e., without the monostearyl fumarate salt, it has only relatively poor antistaling activity as previously indicated. However, when used in conjunction with the microcrystalline fumarates of this invention, it markedly potentiates the activity of the latter, thereby providing novel compositions which are of unexpected value as bread-softeners and dough-improvers. This potentiating or synergistic effect is generally observed when the stearic acid component is used in finely-divided form in conjunction with the fumarate salt at concentration levels ranging from about 15% to about 50% by weight of the fumarate salt. The two ingredients may be preformulated and the combination added to the doughs just prior to baking, as are other dough-improving compositions. In this situation, the active agents called for are preferably mixed in proportions ranging by weight of from substantially between about 13% stearic acid to 87% fumarate and about 33% stearic acid to 67% fumarate. These same compositions are then added to the doughs in whatever amounts the baker desires. For instance, he may wish to provide the same total fumarate content as previously used and thus achieve an increased softening effect due to the potentiation of the fumarate activity by the stearic acid component, or he may mish to substitute the new composition for the fumarate per se on an equivalent-weight basis and thus achieve the same softening effect at decreased cost, the stearic acid component being cheaper than the fumarate. Alternatively, instead of employing a premix, the novel synergistic combination may be obtained by separately adding the stearic acid and the fumarate components directly to the dough, in the same relative proportions, and then blending them together prior to the baking operation.

The specific monostearyl fumarate salts which are useful in the present invention are the microcrystalline sodium, potassium, calcium and magnesium salts. Particularly preferred for reasons of economy, ease of mixing and availability are combinations of the microcrystalline sodium salt of monostearyl fumaric acid with finely-divided stearic acid. Calcium monostearyl fumarate is also very satisfactory for the purpose at hand when potentiated with the same said acid. The potassium salts of the aforementioned stearates may at times be preferred because of their relative solubility and availability. The magnesium salts are fully operable too, although they are generally less available and more expensive. Although the stearic acid component of this invention should preferably be recrystallized to a microcrystalline form or at least be finely-divided, it is sometimes possible to employ the commercial macrocrystalline form as well, keeping in mind that the latter material can vary in particle size from relatively large flakes to a powder and for this reason (i.e., due to the lack of uniformity in particle size), is generally not preferred.

While up to about 2.0% by flour weight of the novel combinations of the present invention may be incorporated in the doughs with resulting improvement in the shelf-life of the ultimate bakery products, best bread softening results with least expense are generally achieved at a maximum level of combined finely-divided stearic acid-fumarate content of 1.0% by flour weight. With specific regard to the sodium salt, the recommended level of the two components, in total, is generally about 0.5% weight of the flour in the dough, with a preferred embodiment involving incorporating in the dough from about 0.43% to about 0.33%, by flour weight, of microcrystalline sodium monostearyl fumarate and from about 0.07% to about 0.17% by flour weight of finely-divided stearic acid, respectively. Of course, still lesser amounts of the new compositions may be employed, but the useful minimum nececssarily needed to achieve appreciable softening effects is generally observed to be about 0.05% by flour weight with respect to the instant combinations.

As hereinbefore indicated, the novel microcrystalline compositions of this invention find their particular utility in bakery products wherein the principal leavening agent employed is yeast. The most common form of such products are, of course, white and dark breads, rolls and cakes. When the new additives are incorporated into the doughs from which these foods are then baked, the resulting products are found to be greatly improved in shelf-life, grain and texture, and to maintain desirable softness properties in the store, and on the housewife's shelf much longer than yeast-leavened bakery products made with other prior art bread softeners. In addition, these new additive combinations function at least as equally as well, in bakery products, as when the prior art microcrystalline fumarate compounds are used alone.

The following examples are given simply to illustrate this invention, but not in any way to limit its scope.

Example I

Samples of the new combinations of this invention were tested as bread softeners by the following technique:

4-hour sponge: Grams
  Flour _____ 1120
  Water _____ 615
  Yeast _____ 40
  Dough conditioner [1] _____ 8

[1] Potassium bromate, 0.3%; ammonium chloride, 9.7%; calcium sulfate, 25%; sodium chloride, 10%; and starch 55%.

These ingredients were added to the McDuffee bowl of a Hobart mixer in the order listed and mixed for one minute at No. 1 speed, using a 3-spindle fork. The bowl was then scraped down and the sponge again mixed for one minute at the No. 2 speed. The sponge was removed from the bowl at this point, placed in a polyethylene bag and allowed to ferment at room temperature (about 77° F.) for four hours.

To prepare the ultimate test bread dough, sponge so prepared was placed in a ten-quart, stainless-steel Hobart mixing bowl and these other ingredients was thereafter added:

Dough portion: Grams
  Flour _____ 480
  Water _____ 417
  Sugar (granulated) _____ 128
  Salt _____ 34
  Calcium propionate preservative _____ 2
  Milk powder _____ 48
  Lard _____ 40
  Bread softener (total) _____ 8

The mixture was mixed at No. 1 speed for one minute and at No. 2 speed for seven minutes using a dough hook. The resultant dough was then removed from the bowl, placed in a polyethylene bag and allowed to ferment for 25 minutes at room temperature (about 77° F.). It was then scaled into 1 lb. portions, with at least four such portions being prepared for each test. These portions were rolled into small balls by hand in order to exclude large air bubbles and gas pockets. Each ball was then run through a sheeter twice, using a 5/16 inch setting for the first path and 3/16 inch setting for the second pass. The sheeted dough was next rolled into a cylinder approximately as long as the pan in which it was to be baked, then placed in a greased pan and transferred to a proof box (allowed to rise) for one hour at 120° F. and 55 percent relatively humidity. The proofed dough was then baked at 430° F. for 25 minutes and the resulting bread subsequently allowed to cool for one hour.

All but one of the bread loaves obtained in this manner for each test were then packaged into polyethylene bags and stored either at room temperature or under refrigeration conditions (45° F.) for various lengths of time, usually from one day to a week, at the end of which time, the staling rate was measured. Each of the unpackaged loaves, on the other hand, was sliced and its initial softness determined as a control.

The determination of staling for each loaf was made by a standard compression test. Two 1-inch thick slices of bread were cut from each loaf, one slice being taken from the center of the loaf and the other approximately one inch from the end. The compression test was performed with a standard penetrometer using a 1-inch diameter flat, stainless steel disc in place of the usual vaseline cone. A 150 g. weight was used as the load on the end of the compression disc. The load was placed on the slice for a period of ten seconds, after which time the penetration was determined in tenths of millimeters. Three compressions were performed on each slice of bread, two in the bottom corners of the slice and the third at the top center. All data were recorded and the six values for each loaf were then averaged.

In the following table, are presented the compression data obtained by this procedure, not only for the new combination of this invention but also, by way of comparison, for the corresponding microcrystalline fumarate compound of the prior art when used alone. The sodium monostearyl fumarate and stearic acid used in the combination had been recrystallized together from hot water at 94° C. in accordance with the procedure (A) hereinafter described.

The microcrystalline sodium monostearyl fumarate and finely divided stearic acid used alone had both been similarly treated in the same manner as the combination for purposes of this comparison.

| Softener test sample | Bread loaf sp. vol. (cc./g.) | Average compressions ($10^{-1}$ millimeters) | | | |
|---|---|---|---|---|---|
| | | Refrigerated 1 day | Room temp. 3 days | Room temp. 4 days | Room temp. 5 days |
| Sodium monostearyl fumarate (A), 0.5% | 5.67 | 115 | 102 | 87 | 79 |
| Same (A) at 0.375% | 5.74 | 111 | 98 | 83 | 73 |
| Stearic acid, 0.5% | 5.73 | 79 | 68 | 63 | 43 |
| (A) At 0.375% plus stearic acid, 0.125% | 5.77 | 118 | 106 | 93 | 82 |

Example II

The procedure of Example I was repeated, using sodium monostearyl fumarate and stearic acid that had been recrystallized together from hot fat (Covo) at 120° C. in accordance with the procedure (B) hereinafter described. In the following table, there are presented the compression data obtained in this manner, including data obtained with similarly treated stearic acid used alone (heated in Covo to 72° C.) for comparison purposes:

| Softener test sample | Bread loaf sp. vol. (cc./g.) | Average compressions (10⁻¹ millimeters) | | | |
|---|---|---|---|---|---|
| | | Refrigerated 1 day | Room temp. 3 days | Room temp. 4 days | Room temp. 5 days |
| Sodium monostearyl fumarate (B), 0.5% | 5.82 | 117 | 96 | 81 | 77 |
| Same (B) at 0.375% | 5.74 | 103 | 88 | 71 | 62 |
| Stearic acid, 0.5% | 5.65 | 97 | 72 | 55 | 48 |
| (B) At 0.375% plus stearic acid, 0.125% | 5.73 | 115 | 98 | 84 | 79 |

Example III

The procedure described in Example I is followed except that microcrystalline potassium monostearyl fumarate is the bread softener employed in place of the corresponding sodium salt in the aforesaid combination with finely-divided stearic acid. In this particular case, the results obtained with respect to the bread softening effect are substantially the same as those previously reported for the corresponding sodium salt in Example I, i.e., combinations of microcrystalline potassium stearyl fumarate at 0.375% together with stearic acid at 0.125%, by flour weight, are slightly superior to potassium stearyl fumarate at 0.5% alone.

In like manner, when microcrystalline calcium monostearyl fumarate and magnesium monostearyl fumarate are each individually used in place of the corresponding potassium salt as indicated above, substantially the same results are again achieved as reported previously in the aforementioned example.

Example IV

The procedure described in Example I is followed except that combinations of microcrystalline sodium monostearyl fumarate at 0.43%, by flour weight, and finely-divided stearic acid at 0.07%, respectively, are employed with equally satisfactory results being achieved as compared to the combination of Example I.

In like manner, good results are also achieved with microcrystalline sodium monostearyl fumarate at 0.33%, by flour weight, and stearic acid at 0.17%, respectively, when used in place of the microcrystalline sodium monostearyl fumarate (0.375%)=stearic acid (0.125%) combination previously discussed.

Example V

The procedure described in Example I is followed except that the particular microcrystalline additive combination is respectively employed at levels of 0.05%, 0.1%, 0.25%, 1.0% and 2.0%, by weight of the flour, with satisfactory results being achieved in each case, i.e., the results achieved are always of the same order of magnitude, with respect to the controls, as when microcrystalline sodium monostearyl fumarate is used alone at these very same concentration levels.

Example VI

The procedure of the previous example is repeated using finely-divided stearic acid in the combination at a weight level as low as 15% by weight of microcrystalline sodium stearyl furmarate. In each and every instance, the results achieved with the combination at the different additive concentration levels are substantially the same as those reported previously in Example V where finely-divided stearic acid is used at a level of 33% by weight of the fumarate salt. In like manner, the same type results are also achieved here when finely-divided stearic acid is employed at a level of 50% by weight of fumarate salt.

Procedure A

Sodium monostearyl fumarate is added to water in an open vessel to provide a slurry consisting of 1800 grams of the fumarate in 10 liters of water. The slurry is heated by means of a steam coil to 90° C., whereby essentially all of the fumarate is solubilized. The solution is then rapidly chilled in an ice bath to 70° C., at which point the desired finely-divided final product precipitates out. Chilling is continued to 45° C., the total cooling time elapsed from 90° C. to this temperature being 30 minutes. The resulting slurry is then filtered, the filter cake dried and de-agglomerated by rough-milling and the microcrystalline sodium monostearyl fumarate thus obtained is found to have particles with average spherical diameter sizes that the substantially all below $5\mu$. (The corresponding fumarate starting material particles are substantially all at least $5\mu$ in diameter and 95% of them are above $10\mu$).

This same batch procedure is repeated using as the starting slurry 1500 grams of macrocrystalline potassium monostearyl fumarate in 10 liters of water. The particles constituting the prior art fumarate are substantially all at least $5\mu$ in diameter and 95% of them are above $10\mu$. The corresponding microcrystalline potassium salt thus obtained has average particle sizes (Fisher spherical diameters) which are substantially all below $5\mu$.

Procedure B

One part by weight of the ordinary coarse particle size fumarate salt was blended into five parts by weight of the molten fat (Covo, a hydrogenated vegetable shortening) maintained at 120° C. on an electric hot stove. The salt easily dispersed in the hot oil to give a good white creamy emulsion. On cooling, the fumarate reprecipitated as very fine particles and the entire system solidified to a homogeneous mass. This solid or semisolid product was suitable for incorporation in doughs "as is," thereby providing both the necessary shortening content for the baked goods and the desired antistaling agent additive as well.

What is claimed is:

1. The method of improving the antistaling properties of yeast-leavened bakery products, which comprises incorporating in the dough prior to baking at least one of the sodium, potassium, calcium and magnesium salts of monostearyl acid fumarate in microcrystalline form together with finely-divided stearic acid at a level of from about 15% to about 50% by weight of the fumarate salt, with the amount of these two components together totalling substantially between about 0.05% and about 2.0% by weight of the flour contained in said dough.

2. The method of claim 1 wherein the microcrystalline fumarate salt is sodium monostearyl fumarate.

3. The method of claim 1 wherein the microcrystalline fumarate salt is calcium monostearyl fumarate.

4. The method of claim 1 wherein there is incorporated in the dough a total of from about 0.1% to about 1.0% by flour weight of the microcrystalline mixture of monostearyl fumarate salt and stearic acid.

5. The method of claim 1 wherein there is incorporated in the dough from about 0.43% to about 0.33%, by flour weight, of microcrystalline sodium monostearyl fumarate and from about 0.07% to about 0.17% by flour weight of finely-divided stearic acid, respectively.

6. Yeast-leavened doughs containing an effective amount up to about 2.0% by flour weight of a combination of at least one of the sodium, potassium, calcium and magnesium salts of monostearyl acid fumarate in microcrystalline form together with from about 15% to about 50%, by weight of the fumarate salt, of finely-divided stearic acid.

7. Bread dough containing from between about 0.1% and about 0.5% by flour weight of a combination of microcrystalline sodium monostearyl fumarate together with from about 15% to about 50%, by weight of the fumarate, of finely-divided stearic acid.

8. A composition of matter useful as a bread softener, which contains as the principal active ingredients therein a compound selected from the group consisting of at least one of the sodium, potassium, calcium and magnesium salts of monostearyl acid fumarate in microcrystalline form and from about 15% to about 50%, by weight of the fumarate, of finely-divided stearic acid.

References Cited

UNITED STATES PATENTS

| 3,343,964 | 9/1967 | Thomas. |
| 3,360,375 | 12/1967 | Buddemeyer et al. |

FOREIGN PATENTS

| 576,055 | 3/1946 | Great Britain. |

RAYMOND N. JONES, Primary Examiner

JAMES R. HOFFMAN, Assistant Examiner

U.S. Cl. X.R.

99—86, 92